US011347717B2

(12) United States Patent
Dubeyko et al.

(10) Patent No.: US 11,347,717 B2
(45) Date of Patent: *May 31, 2022

(54) GENERALIZED VERIFICATION SCHEME FOR SAFE METADATA MODIFICATION

(71) Applicant: Western Digital Technologies, Inc., San Jose, CA (US)

(72) Inventors: Viacheslav Dubeyko, San Jose, CA (US); Adam Manzanares, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/523,960

(22) Filed: Jul. 26, 2019

(65) Prior Publication Data

US 2019/0354517 A1 Nov. 21, 2019

Related U.S. Application Data

(63) Continuation of application No. 15/140,241, filed on Apr. 27, 2016, now Pat. No. 10,380,100.

(51) Int. Cl.
*G06F 16/20* (2019.01)
*G06F 16/23* (2019.01)
(Continued)

(52) U.S. Cl.
CPC ............ *G06F 16/2365* (2019.01); *G06F 3/06* (2013.01); *G06F 3/0619* (2013.01);
(Continued)

(58) Field of Classification Search
None
See application file for complete search history.

(56) References Cited

U.S. PATENT DOCUMENTS 6,584,582 B1 6/2003 O'Connor
6,732,124 B1 * 5/2004 Koseki ............... G06F 11/1435
(Continued)

FOREIGN PATENT DOCUMENTS

CN 104038486 A 9/2014
CN 104268758 A 1/2015
(Continued)

OTHER PUBLICATIONS

BC—Namespaces and Naming Conventions (BC-CTS-NAM), 2001, SAP AG, Release 4.6C, 26 pages.
(Continued)

*Primary Examiner* — Jau Shya Meng
(74) *Attorney, Agent, or Firm* — Morgan, Lewis & Bockius LLP

(57) ABSTRACT

System and method of verifying validity of a metadata modification request to prevent improper metadata operations. During initialization of a volume in a storage device and once a metadata area is reserved for a metadata structure, information characterizing the metadata structure and metadata area is stored in the storage device, which may be in the form of an area legend composed of descriptors such as a magic signature, a node size, a clump size of reservation, and extent of the metadata area. Responsive to a request for operating on metadata, relevant information provided in the request is verified against the stored characteristic information. If the verification discovers an inconsistency between the information provided in the request and the stored characteristic information, the request modification is treated as invalid and blocked from operation.

20 Claims, 12 Drawing Sheets

(51) Int. Cl.
  *G06F 16/11* (2019.01)
  *G06F 11/30* (2006.01)
  *G06F 3/06* (2006.01)
  *G06F 16/27* (2019.01)
(52) U.S. Cl.
  CPC .......... *G06F 3/0644* (2013.01); *G06F 3/0659* (2013.01); *G06F 11/30* (2013.01); *G06F 16/122* (2019.01); *G06F 16/273* (2019.01)

(56) References Cited

U.S. PATENT DOCUMENTS

| | | |
|---|---|---|
| 7,206,785 B1 | 4/2007 | Stephens |
| 7,305,393 B2 | 12/2007 | Seeger et al. |
| 7,430,570 B1 | 9/2008 | Srinivasan et al. |
| 7,529,745 B2 | 5/2009 | Ahluwalia et al. |
| 7,640,412 B2 | 12/2009 | Molaro et al. |
| 8,086,585 B1 | 12/2011 | Brashers |
| 8,555,022 B1 | 10/2013 | Edwards |
| 9,250,823 B1 | 2/2016 | Kamat |
| 9,256,373 B1 | 2/2016 | Liang |
| 9,529,735 B2 | 12/2016 | Hashimoto |
| 9,804,966 B1 | 10/2017 | Sadanandan |
| 2003/0163553 A1 | 8/2003 | Kitamura |
| 2004/0186946 A1 | 9/2004 | Lee |
| 2004/0210607 A1 | 10/2004 | Manchanda |
| 2006/0112096 A1 | 5/2006 | Ahluwalia et al. |
| 2006/0117056 A1 | 6/2006 | Havewala et al. |
| 2006/0129614 A1 | 6/2006 | Kim et al. |
| 2006/0282471 A1 | 12/2006 | Mark et al. |
| 2007/0016695 A1* | 1/2007 | Rabbers ............... G06F 16/275 709/248 |
| 2007/0028293 A1* | 2/2007 | Boerries ............... H04L 67/327 726/2 |
| 2009/0177721 A1 | 7/2009 | Mimatsu |
| 2010/0023847 A1 | 1/2010 | Morita |
| 2010/0125586 A1 | 5/2010 | VanVieck |
| 2010/0191779 A1* | 7/2010 | Hinrichs ............. G06F 16/1727 707/822 |
| 2011/0099461 A1 | 4/2011 | Rajpal |
| 2011/0106802 A1 | 5/2011 | Pinkney et al. |
| 2012/0110043 A1 | 5/2012 | Cavet |
| 2012/0110281 A1 | 5/2012 | Green |
| 2013/0067148 A1 | 3/2013 | Takagi |
| 2013/0238876 A1 | 9/2013 | Fiske |
| 2013/0246709 A1 | 9/2013 | Segelken et al. |
| 2014/0040540 A1 | 2/2014 | Pruthi |
| 2014/0188957 A1 | 7/2014 | Hosoi |
| 2014/0258599 A1 | 9/2014 | Rostoker et al. |
| 2015/0347492 A1 | 12/2015 | Dickie |
| 2016/0150047 A1 | 5/2016 | O'Hare |
| 2017/0255415 A1 | 9/2017 | Dubeyko |
| 2017/0277715 A1 | 9/2017 | Strauss |
| 2017/0316027 A1 | 11/2017 | Mondal |
| 2017/0316047 A1 | 11/2017 | Dubeyko |
| 2017/0322927 A1 | 11/2017 | Dubeyko |

FOREIGN PATENT DOCUMENTS

| | | |
|---|---|---|
| KR | 100308873 B1 | 11/2001 |
| KR | 20140026821 A | 3/2014 |
| WO | 2008093961 A1 | 8/2008 |
| WO | WO 2014/147816 | 9/2014 |

OTHER PUBLICATIONS

Fryer et al., Recon: Verifying File System Consistency at Runtime, University of Toronto, 2012, http://www.eecg.toronto.edu/~ashvin/publications/recon-fs-consistency-runtime.pdf, 14 pages.

How can I create an empty namespace object without overwriting another object with the same name?, Feb. 24, 2012, retrieved from https://stackoverflow.com/questions/9425943/how-can-i-create-an-empty-namespace-object-without-overwriting-another-object-wi, 9 pages.

Metz, Creating Higher Performance Solid State Storage with Non-Volatile Memory Express (NVMe), Data Storage Innovation Conference, 2015, 9 pages.

Poster—Recon: Verifying File System Consistency at Runtime, 2012 SCM Transactions on Storage, retrieved from https://www.usenix.org/legacy/events/fast/poter_refereed/Fryerposter.pdf, 1 page.

Song et al., Metadata Invariants: Checking and Inferring Metadata Coding Conventions, 2012, http://people.cs.vt.edu/tilevich/papers/icse2012.pdf, 11 pages.

XFS Self Describing Metadata, Oct. 2015, retrieved from https://www.kernel.org/doc/Documentation/filesystems/xfs-self-describing-metadata.txt, 6 pages.

* cited by examiner

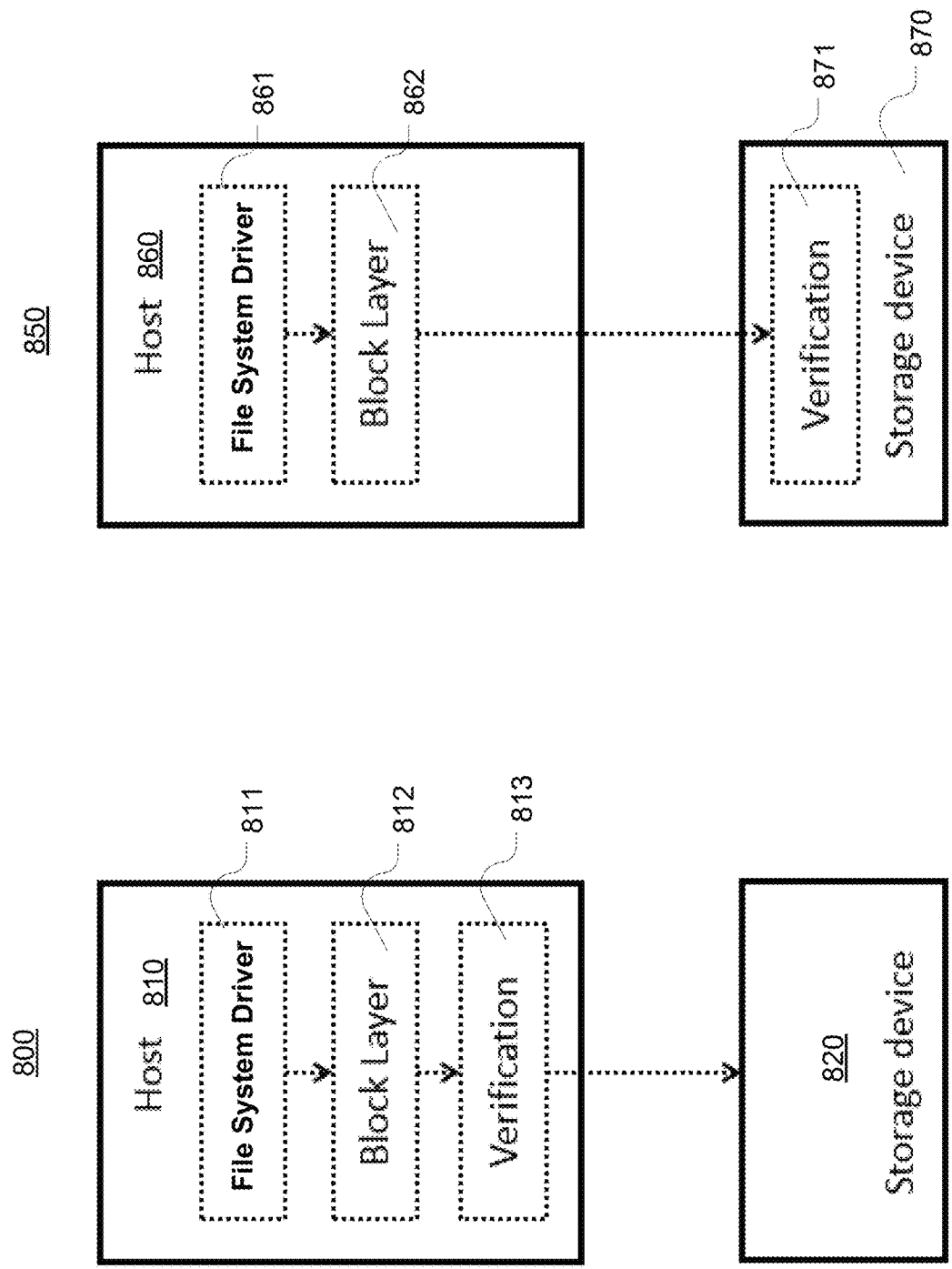

GENERALIZED VERIFICATION SCHEME FOR SAFE METADATA MODIFICATION

CROSS-REFERENCE TO RELATED APPLICATIONS

This application is a continuation application of application Ser. No. 15/140,241, entitled "Generalized Verification Scheme For Safe Metadata Modification," filed on Apr. 27, 2016, now U.S. Pat. No. 10,380,100. This patent application is related to: the co-pending commonly-assigned U.S. patent application Ser. No. 15/058,538, now U.S. Pat. No. 10,310,925, entitled "Method of Preventing Metadata Corruption By Using a Namespace and a Method of Verifying Changes to the Namespace"; and the co-pending commonly-assigned U. S. patent application Ser. No. 15/146,685, now U.S. Pat. No. 10,380,069, entitled "Generalized Write Operations Verification Method." The foregoing applications are herein incorporated by reference in entirety for all purposes.

TECHNICAL FIELD

The present disclosure relates generally to prevention of metadata corruption in the field of data storage management and, more particularly, in the field of file systems.

BACKGROUND OF THE INVENTION

In various operating systems, file systems are used to organize digital files to facilitate storage and retrieval of the files. File systems can manage and organize data blocks stored on a data storage device into files and directories. Metadata is used by file systems to maintain the information on the usage of data blocks and is often stored on the same storage device with the data files, e.g., user data.

The consistency of file system metadata is crucial to the operation of a file system and the accessibility of user data. Occasionally, end users' workloads can trigger improper or buggy behavior, which is true of both unstable and mature file systems. Recovering a corrupted file system volume is very time-consuming and typically involves a file system check utility operating in an unmounted or offline state of file system volume. This can prevent the storage device from operating efficiently and correctly, for example, by causing unacceptable delay of data access by users and the associated application programs. Moreover, recovering a corrupted file system volume is a non-trivial task, especially for complex metadata corruptions. Thus, a file system checking utility is unable to guarantee a file system volume consistency by means of recovering file system metadata to a consistent state from all possible corruptions.

Prevention of a file system metadata corruption is a more promising approach as compared to using a check utility to recover a corrupted file system. However, existing technologies of preventing corruption undesirably and commonly involve complicated logic and are specific to individual file systems and corruption causes.

SUMMARY OF THE INVENTION

It would also be advantageous to provide a data storage system capable of preserving consistency of metadata with enhanced efficiency, reliability, and generality.

Embodiments of the present disclosure employ a verification system which implements a verification process before a requested modification or other write operation on file system metadata is performed. During initialization of a file system volume in a storage device and once a metadata area is reserved for a metadata structure, information characterizing the metadata structure and metadata area is stored in the storage device, which may be in the form of an area legend composed of descriptors such as a magic signature, a node size, a clump size for future reservations, and extent of the metadata area. Responsive to a request for updating the metadata stored in the metadata area, relevant information provided in the request is verified against the stored information. In addition, if a user data write request tries to modify a metadata area, the modification can be prevented through verification against the stored information regarding the metadata area. Likewise, if a metadata write request tries to modify a physical sector(s) outside of any metadata area, the modification can be prevented through the verification process as well. Moreover, improper modification of metadata area by metadata write requests can be prevented by verification, particularly by means of magic signature and/or sequential identification number of metadata node checking.

If a verification process discovers an inconsistency between the information provided in the request and the stored information as in metadata area legend, the request modification is treated as detrimental or invalid and may not be performed. As a result, the stored metadata can be protected from a potentially unsafe modification. A specific area in the storage device (e.g., dedicated partition, partition table, special non-volatile memory chip and so on) can be designated for storing namespaces, which aggregate the area legends for the reserved metadata areas. A request for an operation on a namespace or an area legend can also be subject to validity verification based on the values of the descriptors. A verification process can be controlled and executed by software or hardware logic implemented in a host or a storage device.

By using a verification system and process, a file system volume according to the present disclosure can be effectively prevented from metadata corruption, advantageously reducing or eliminating the need for a potentially time-consuming and unpredictable recovery process as required after the fact. Furthermore, as the information relied upon for verification pertains to metadata structure and metadata area characteristics, the information is inherently available in various file systems. Therefore, such a verification process is advantageously generic to different types of file systems and corruption causes.

In one embodiment of the present disclosure, a method of verification of file system volume modifications includes, in response to a write request for modifying a file system volume, accessing stored values associated with a set of descriptors characterizing a metadata structure and reserved area for the metadata structure. The validity of the request is verified based on the request and the stored values associated with the set of descriptors.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements and in which:

FIG. 8A illustrates the configuration of an exemplary data storage system with a verification subsystem resident on a host according to an embodiment of the present disclosure;

FIG. 8B illustrates the configuration of another exemplary data storage system with a verification subsystem resident on a storage device according to an embodiment of the present disclosure;

DETAILED DESCRIPTION

Figure 1:
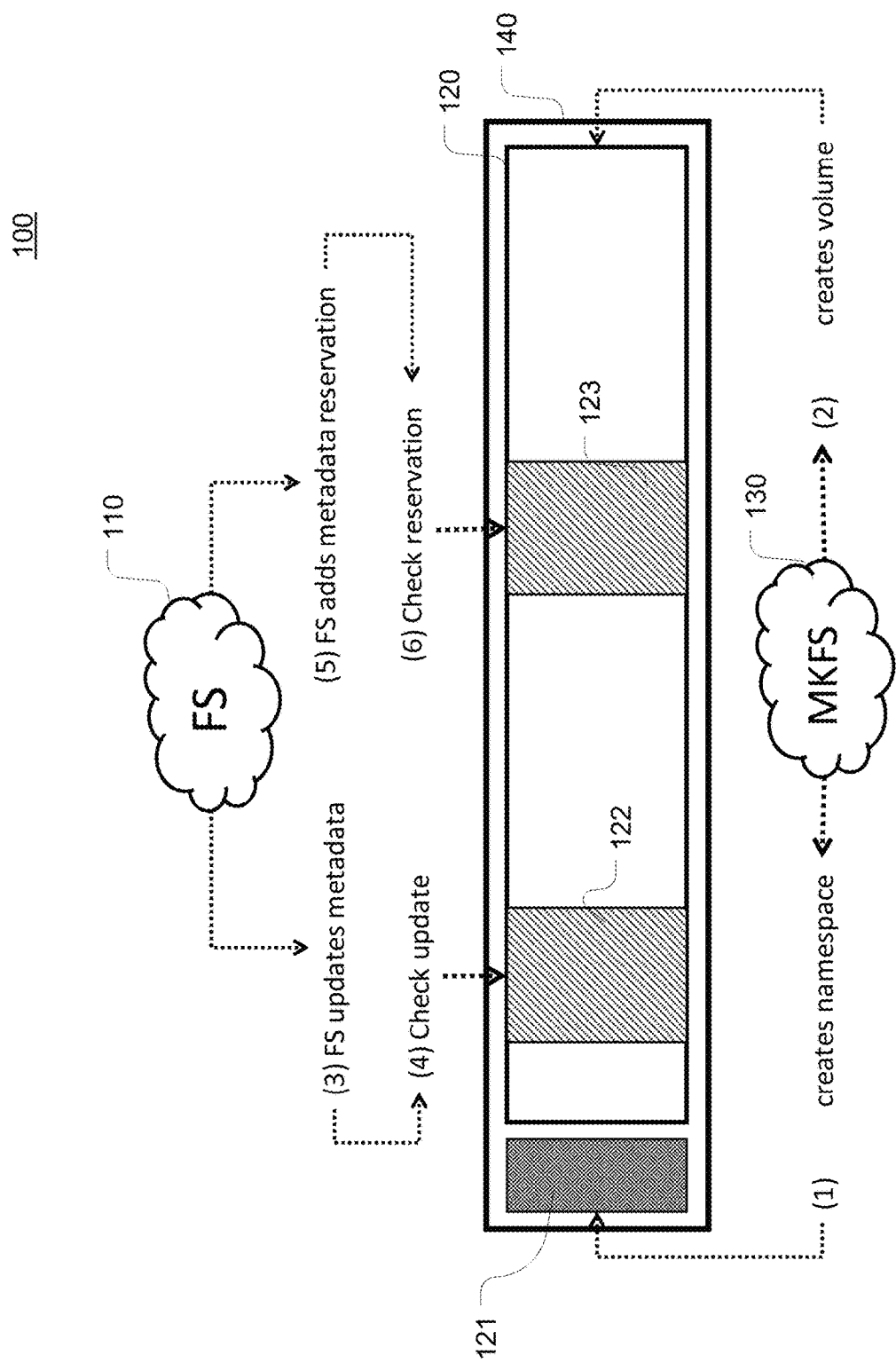
FIG. 1 illustrates an exemplary verification system capable of preventing unsafe data storage content modifications according to an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Notation and Nomenclature

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer-readable media into other data similarly represented as physical quantities within the computer system memories or registers or other such information storage, transmission, or display devices. When a component appears in several embodiments, the use of the same reference numeral signifies that the component is the same component as illustrated in the original embodiment.

Overall, embodiments of the present disclosure provide a verification mechanism to prevent unsafe data storage content modifications based on descriptors characterizing the metadata structure and/or metadata areas. The descriptors can be generated and stored during allocation and initialization of the metadata areas. A request for data storage content modification is verified against the stored descriptors related to the reserved metadata areas to determine whether the requested operation tends to result in metadata inconsistency.

FIG. 1 illustrates an exemplary verification system 100 capable of preventing unsafe data storage content modifications according to an embodiment of the present disclosure. As shown, the verification system 100 includes a file system driver 110, a file system volume 120 in a storage device 140, and a file system creation utility, which is the MKFS utility 130 in this example. The system 100 also includes a storage driver (not shown), which cooperates with the MKFS utility 130 and file system driver 110 to implement the verification process.

More specifically, the MKFS utility 130 creates the file system volume 120 (as shown by "(2)") by reserving and initializing the storage space (e.g., metadata areas 122 and 123) for metadata structures inside a partition of the storage device 140. According to the present disclosure, the MKFS utility also creates a namespace stored in the storage device (as shown by "(1)"). As described in greater detail below, the namespace includes a collection of verified area legends, each verified area legend containing key information that characterizes corresponding metadata areas and/or metadata structures. The namespace is stored in a dedicated partition 121 of the storage device 140 or stored into a Master Boot Record (MBR) partition table or a Globally Unique Identifier GUID Partition Table (GPT). In some other embodiments, a namespace can be stored in a special memory chip in a storage device (e.g., NAND flash memory). The namespace may also be encrypted, and only requests that contain a secret key can access the namespace to perform namespace modification operations.

During operation, when the file system driver 110 initiates a write request for adding or updating a metadata record(s) or a user data stored in the file system volume 120 (as shown by "(3)"), the request is verified based on the existing area legends associated with the partition 120 (as shown by "(4)"). These existing area legends are created during an operation of metadata areas reservation, for example. If the descriptors provided in a request match the information stored as the area legends, the requested operation can be performed. Whereas, if the verification process treats the requested modification operation in the write request as invalid, the requested modification on the file system volume can be blocked. In some embodiments, a negative result from such a verification process is reported and recorded to facilitate users' discovery of suspicious activities that cause file system corruption.

When the file system driver 110 needs to reserve another metadata area (as shown by "(5)"), it locates some free space on the file system volume, allocates and reserves this area internally, prepares the area legend for the reserved area, and tries to store this area legend into the namespace. Another independent subsystem (for example, a device driver on the host side or controller of the storage device) can be used to check the new area legend (as shown by "(6)"). If a new area legend has a magic signature that is different from the magic signature in any existing area legend, the new area legend can be added. But if the magic signature in the new area legend is the same as the magic signature in any existing area legend, the new area legend needs to be verified. On the other hand, if the verification process determines that the new area legend is invalid, then the request of namespace modification is treated as invalid and, accordingly, the requested operation can be blocked. In some embodiments, a negative result from such a verification process is reported and recorded to facilitate users' discovery of suspicious activities that cause file system corruption.

Thus, a verification scheme according to the present disclosure can effectively prevent file system metadata corruption, advantageously reducing or eliminating the need for a potentially time-consuming and unpredictable recovery process as required after the fact.

Figure 2:
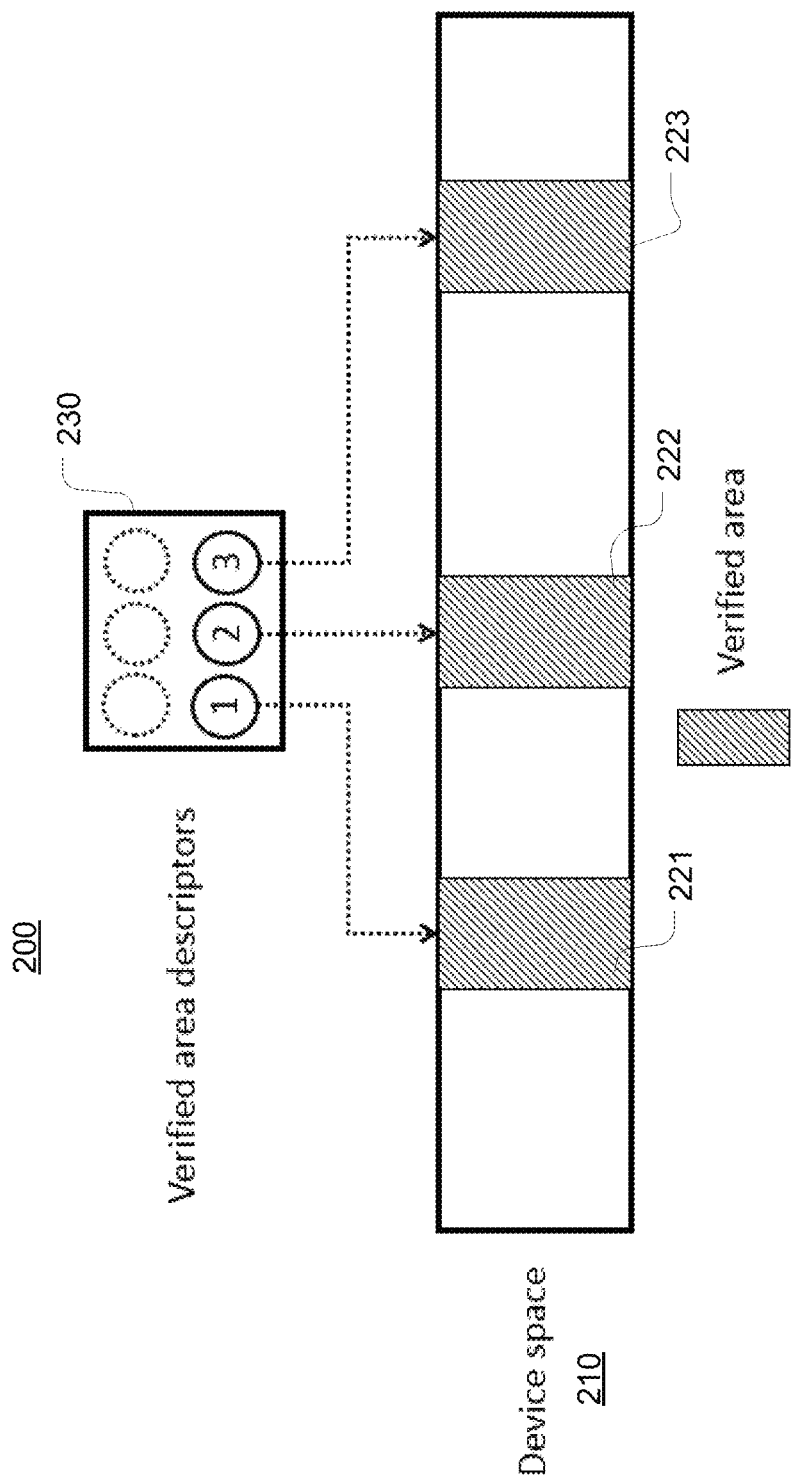
FIG. 2 illustrates an exemplary logical architecture that utilizes stored descriptors to verify write requests for metadata operations on the verified areas according to an embodiment of the present disclosure.

FIG. 2 illustrates an exemplary logical architecture 200 that utilizes stored descriptors to verify write requests for metadata operations on the verified areas 221-223 according to an embodiment of the present disclosure. The stored descriptors 230 describe the verified areas 221-223 in the device space 210.

Figure 3A:
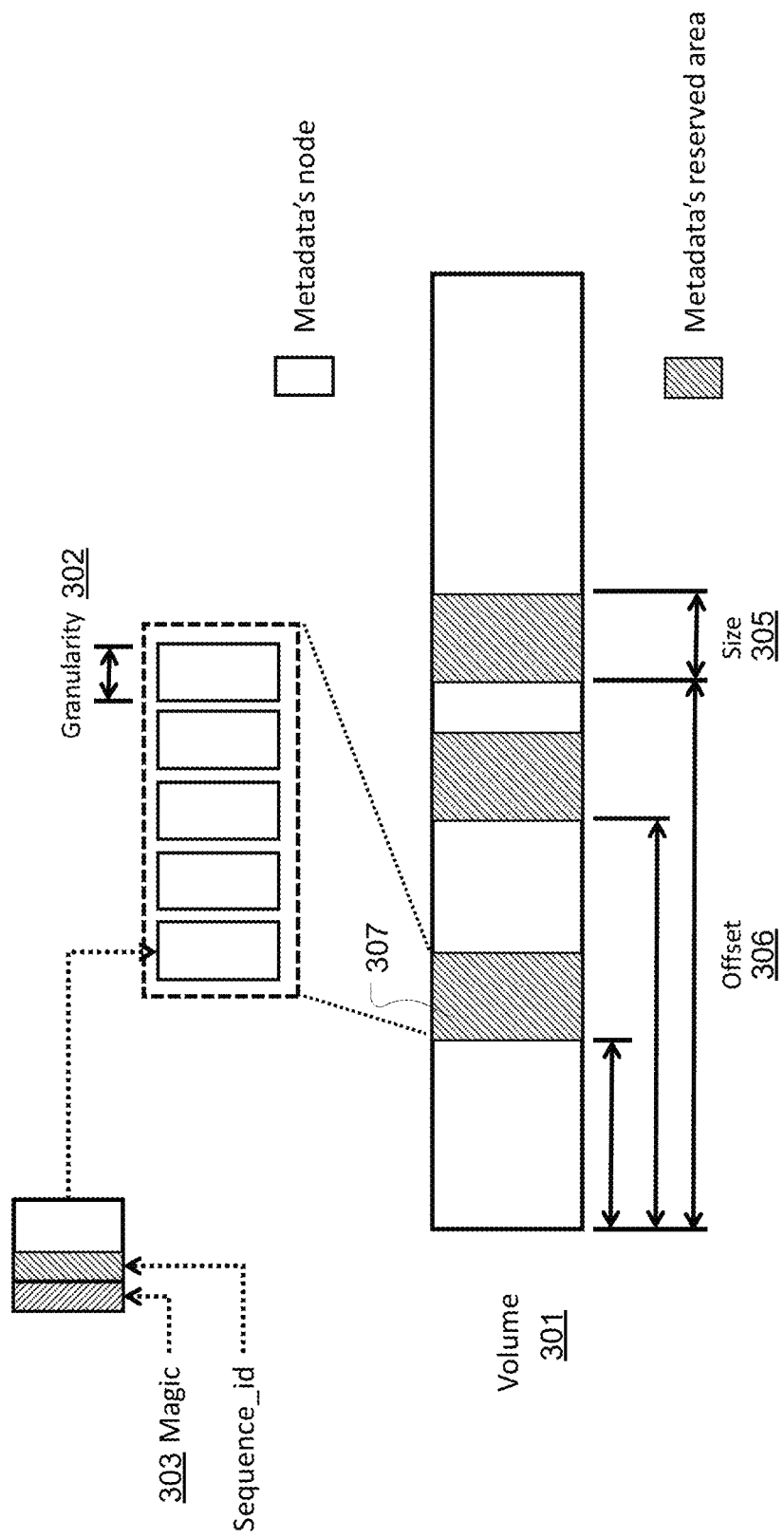
FIG. 3A illustrates the exemplary information used to characterize metadata areas for preventing unsafe operations on the associated metadata structures in accordance with an embodiment of the present disclosure.

It will be appreciated that the present disclosure is not limited to any specific type of information used to characterize a metadata structure and/or metadata area for verification purposes. FIG. 3A illustrates the exemplary information used to characterize metadata areas for preventing unsafe operations on the associated metadata structures in accordance with an embodiment of the present disclosure.

Once the file system volume 301 is created by a file system creation utility, metadata areas in the file system volume are reserved for metadata structures. As such, each metadata area in the file system volume 301 has been defined by values of, and can be characterized by, a set of descriptors including one or more of magic signature, node size, a clump size of possible reservations, and an extent.

More specifically, in the illustrated example, the magic signature 303 is a special pre-defined value that identifies a particular metadata structure. The node size 302 is a granularity of a portion of metadata items to be placed in the metadata structure. The clump size of reservation 305 may be a minimum, a maximum, or a default size of a contiguous metadata area 307. The placement of the reserved metadata area is described by means of offset 306 and size 305, e.g., in terms of the start block and the number of blocks in the area (or the offset from the start block). As the information selected for characterizing the metadata structures and metadata areas is defined during file system volume initialization and inherently available in various files systems, the verification process that exploits this information is advantageously generic to file systems.

Figure 3B:
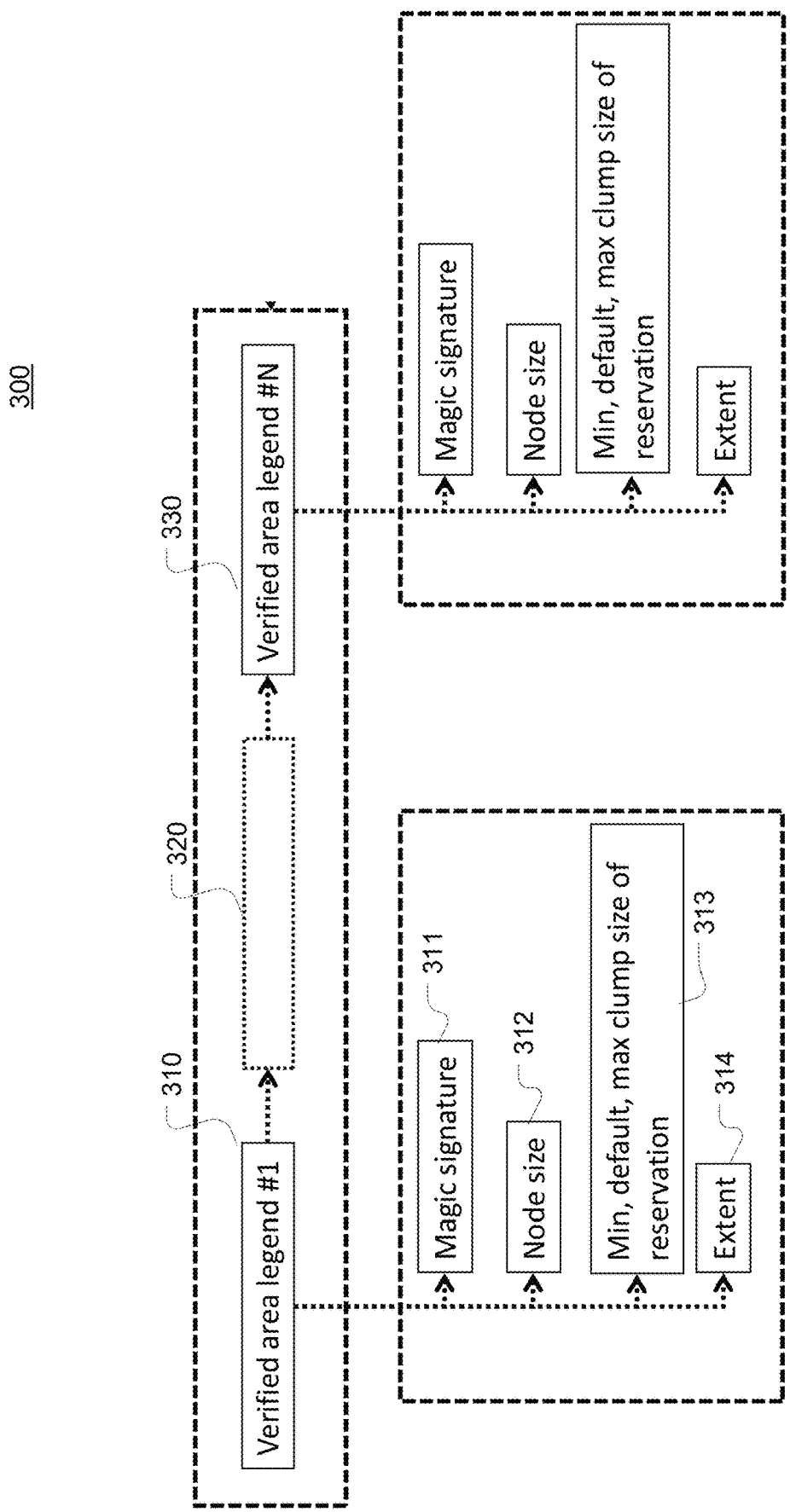
FIG. 3B illustrates an exemplary data structure of namespace according to an embodiment of the present disclosure.

It will be appreciated by those skilled in the art that the present disclosure is not limited by the format or data structure used to organize the characteristics information of metadata areas and metadata structures for verification purposes. FIG. 3B illustrates an exemplary data structure 300 of namespace according to an embodiment of the present disclosure. In this example, the information is represented in verified area legends 310, 320, and 330, each legend corresponding to the metadata area reserved for a respective metadata structure. Each legend includes values for a set of descriptors, namely magic signature 311, node size 312, clump size of reservation 313, and extent 314. As the descriptors are independent of the peculiarities of an individual file system and metadata content, a verification scheme that relies on the descriptors according to the present disclosure is generally applicable to various file systems. The verified area legends can be in Extensible Makeup Language (XML), plain text, or any other suitable format that is well-known in the art.

Figure 4:
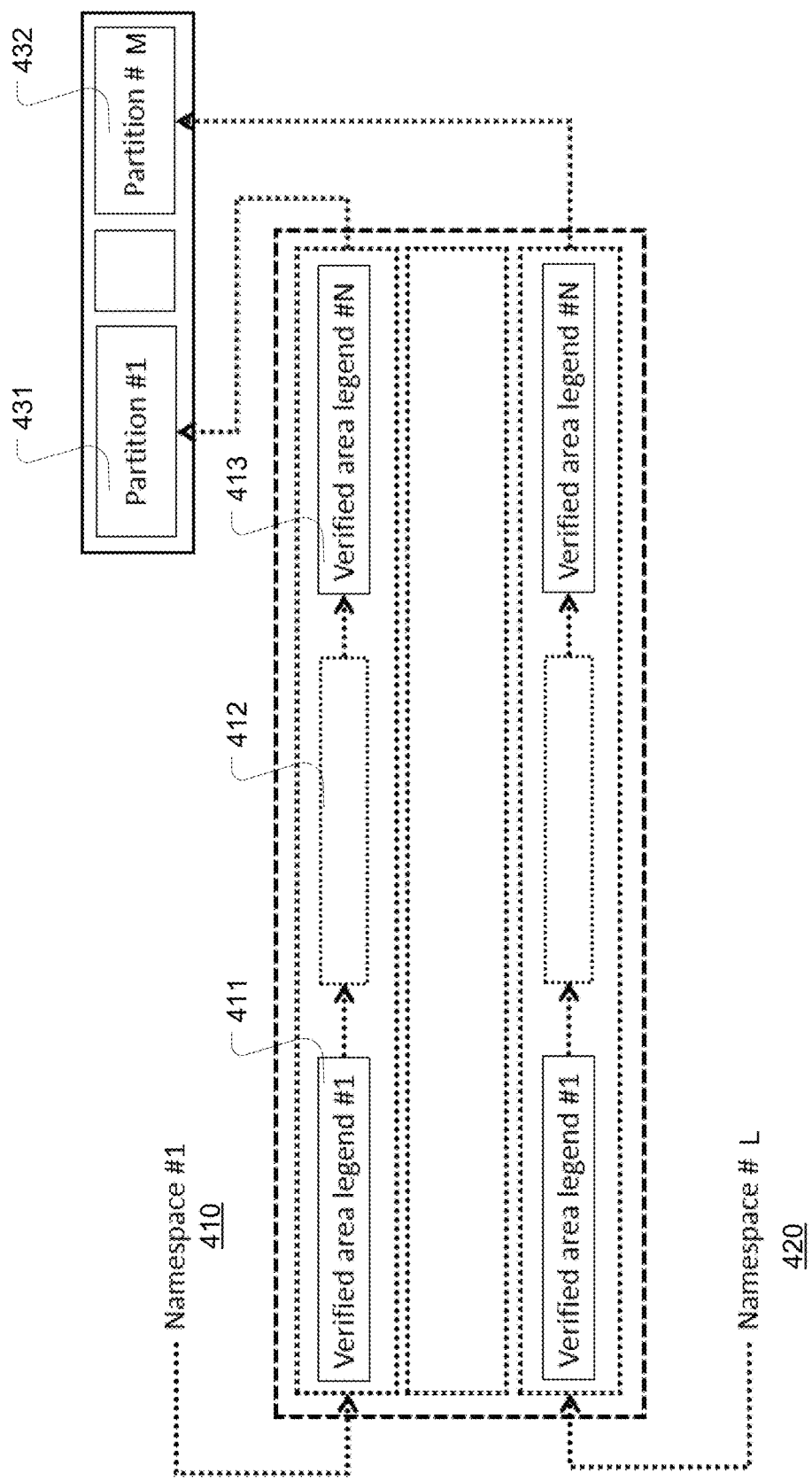
FIG. 4 illustrates an exemplary arrangement of namespaces in a storage device according to an embodiment of the present disclosure.

It is commonplace that a respective file system resides in a dedicated partition of a storage device. An aggregation of verified area legends that describe all the metadata areas of a concrete file system volume can be stored in a different partition than the file system. Thus, the area legends provide an independent source of information about the file system volume. The aggregation of the verified area legends is referred to as a namespace herein. FIG. 4 illustrates an exemplary arrangement of namespaces in a storage device according to an embodiment of the present disclosure. In this example, the storage device includes a plurality of partitions 1-M (e.g., 431 and 432), each associated with a respective namespace (e.g., 410 or 420). Each namespace includes the verified area legends (e.g., 411-413) that describe the metadata areas in the corresponding partition.

According to the present disclosure, the characterization information contained in a namespace is used in a verification process to ensure the validity of a requested file system volume modification operation on metadata or user data. Further, the information in a namespace can be edited upon request. For example, a namespace operation may be adding an area legend to the namespace, removing an area legend from the namespace, or deleting an entire namespace, etc. Since improper operations on a namespace can also cause metadata inconsistency, a request for editing the namespace may be subject to a verification process according to the present disclosure, as described in greater detail below.

Figure 5:
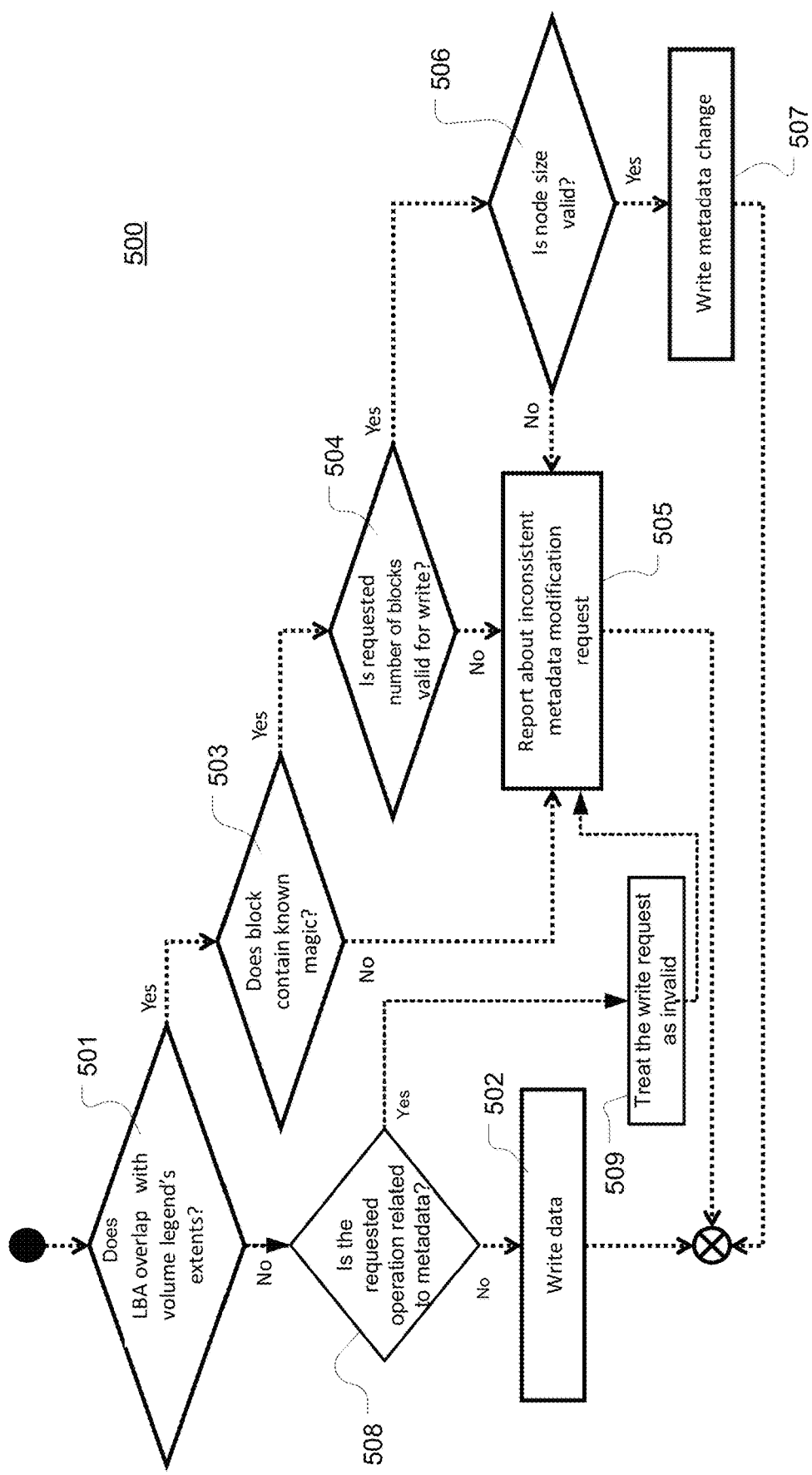
FIG. 5 is a flowchart depicting an exemplary verification process responsive to a write request for changing content (metadata or user data) in a file system volume according to an embodiment of the present disclosure.

FIG. 5 is a flowchart depicting an exemplary verification process 500 responsive to a write request for changing content (metadata or user data) in a file system volume according to an embodiment of the present disclosure. Such a modification request typically is generated by a file system driver, a special user space utility capable of modifying any physical sector in the file system volume, or a specialized user-space utility capable of working with volume of some file system by extracting data or modifying file system states. During verification, the write request is analyzed to extract pertinent information, which is checked against the stored verified area legend related to the metadata. In this example, the extracted information includes a Logical Block Address (LBA), presence of a known magic signature, a number of blocks, and a node size.

More specifically, at 501, it is determined whether the write request is directed to writing into any metadata area based on whether the LBA provided in the request overlaps with the extent in any volume legend into the namespace. If it does not overlap, the type of the request is checked at 508, e.g., metadata or user data. If the type of the request is user data, the requested operation of writing the user data is performed according to the request at 502. However, if it does not overlap and the write request is of type metadata, the write request is determined to be invalid (at 509) and reported as an inconsistent metadata modification request. If the LBA overlaps with any extent, it is determined whether the byte stream of write request contains the same magic signature as provided in the area legend (at 503), whether the requested number of blocks is valid for writing into metadata area (at 504), and whether the size of write request is equal to size of one or several nodes as described in the area legend (at 506). If any of the information provided in the request is inconsistent with the values in the verified area legend, the request is declared as invalid (at 505), as it would result in metadata inconsistency. Otherwise, the request passes the verification, and the metadata is changed according to the write request at 507.

Figure 6:
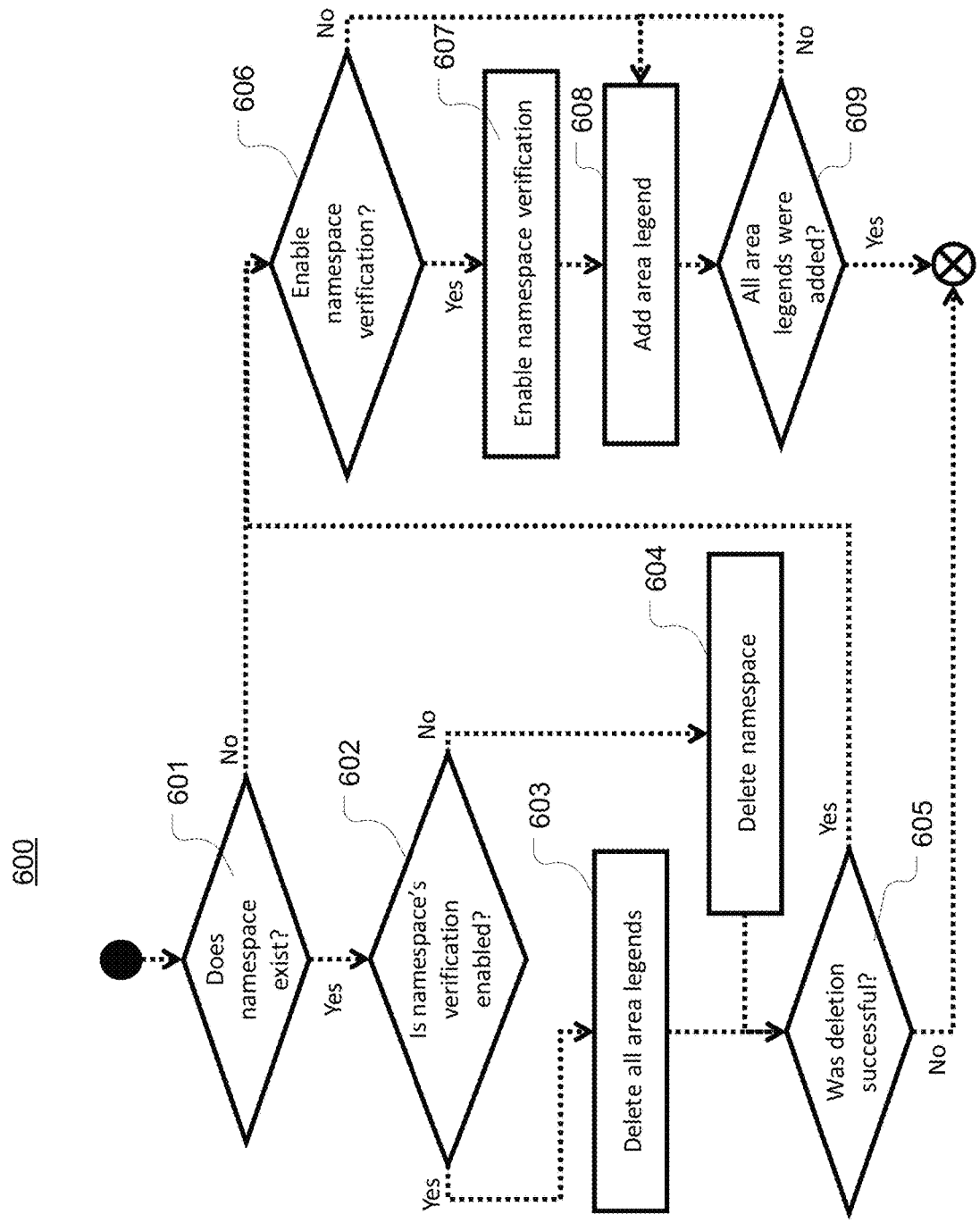
FIG. 6 is a flowchart depicting an exemplary process responsive to a request for creating a namespace according to an embodiment of the present disclosure.

FIG. 6 is a flowchart depicting an exemplary process responsive to a request for creating a namespace according to an embodiment of the present disclosure. At 601, it is determined whether the namespace has already been created. If "yes" and if a namespace verification process is disabled (as determined at 602), the existent namespace is deleted without verification at 604, followed by a confirmation of the deletion at 605. However, if the namespace already exists and the verification process is enabled, area legends in the namespace are checked before being deleted at 603, and the deletion is confirmed at 605. A process that tries to delete legends into namespace prepares the same set of area legends based on knowledge of file system volume internals. If the prepared set of area legends are inconsistent with the area legends contained in the namespace that is to be deleted, then the verification process may discard the deletion operation.

On the other hand, if the namespace to be created does not exist (as determined in 601), at 606 it is determined whether the namespace verification is intended to be enabled. If not to be enabled, the area legends of the namespace are added at 608. At 609, it is checked whether all the area legends are added. However, if the namespace verification is intended to be enabled (as determined at 606), the verification mechanism is enabled at 607, for example by setting a flag or any other suitable manner that is well known in the art.

After metadata structures in a file system volume are created by file system creation utility, the associated namespace may be deleted or otherwise modified. According to the present disclosure, a namespace verification process can be used to protect the namespace from improper operations. According to embodiments of the present disclosure, a namespace includes an identification number, all of the magic signatures for the created verified areas, and all of their node sizes. Upon receiving a namespace deletion request, a namespace verification process is performed to determine whether the namespace content is described properly in the deletion request and, accordingly, determine the validity of the deletion request.

Figure 7A:
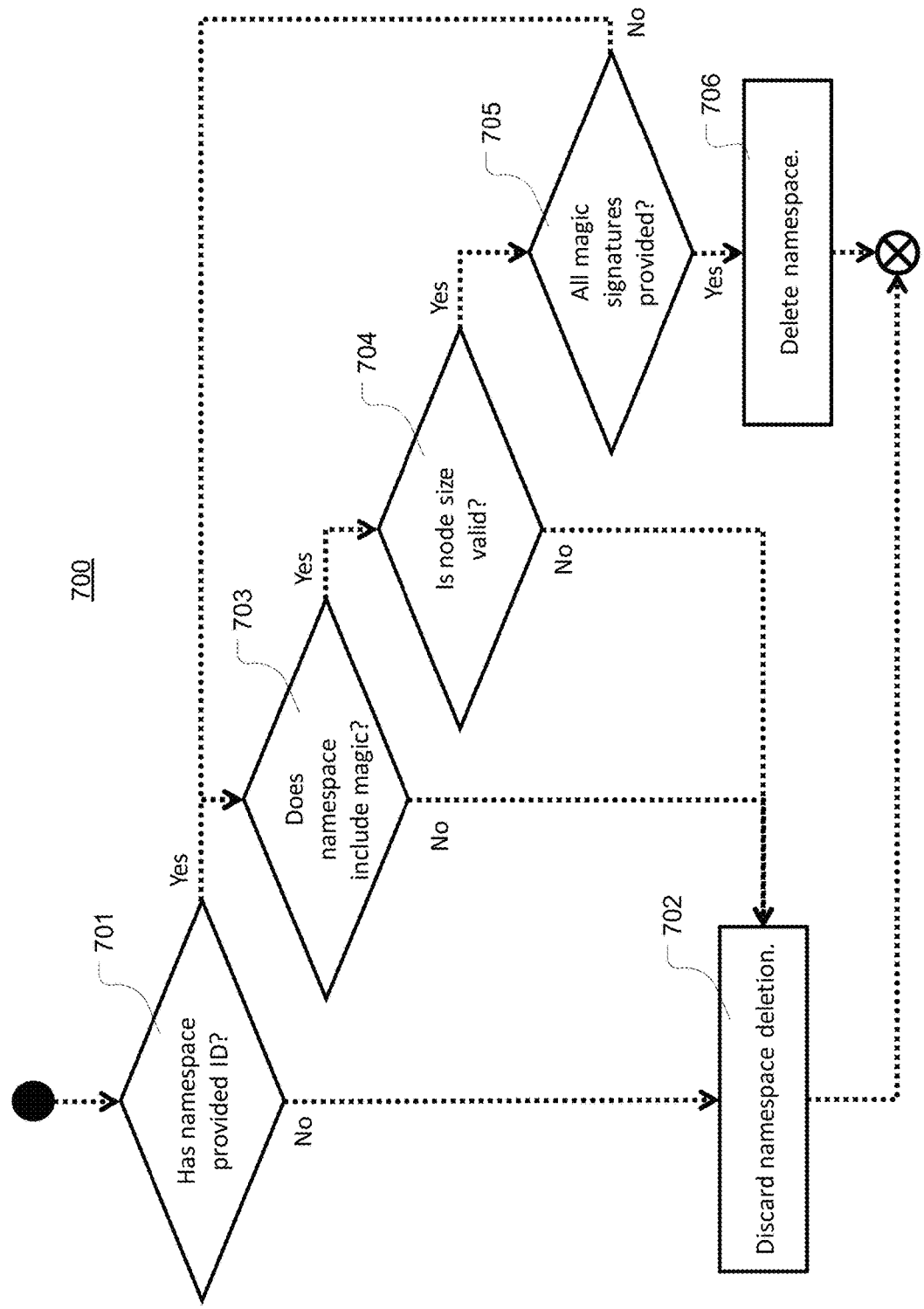
FIG. 7A is a flowchart depicting an exemplary verification process responsive to a request for deleting a namespace that is associated with a partition according to an embodiment of the present disclosure.

FIG. 7A is a flowchart depicting an exemplary verification process 700 responsive to a request for deleting a namespace that is associated with a partition according to an embodiment of the present disclosure. The request may be generated based on a user request or an application program. For example, the process 700 may be used in performing block 603 in FIG. 6. In some embodiments, the request for deleting a namespace may be generated based on a request for creating a namespace as described with reference to FIG. 6. In the verification process 700, the area legends that are prepared by the process that tries to delete the namespace are checked. The area legends are prepared on the basis of knowledge of file system internals. Then, a verification process compares existing area legends with the prepared ones.

More specifically, at 701, it is determined whether the request provides a valid identification number of the namespace. If not, the request is discarded at 702. If the request provides a valid namespace identification number, it is further determined whether the namespace includes magic 703, the request provides valid node sizes 704, and the request provides all of the magic signatures of the metadata structures 705. If any of the information is determined to be inconsistent with the stored namespace, the request for namespace deletion is declared invalid and may be discarded at 702. Otherwise, the namespace is deleted as requested at 706.

Figure 7B:
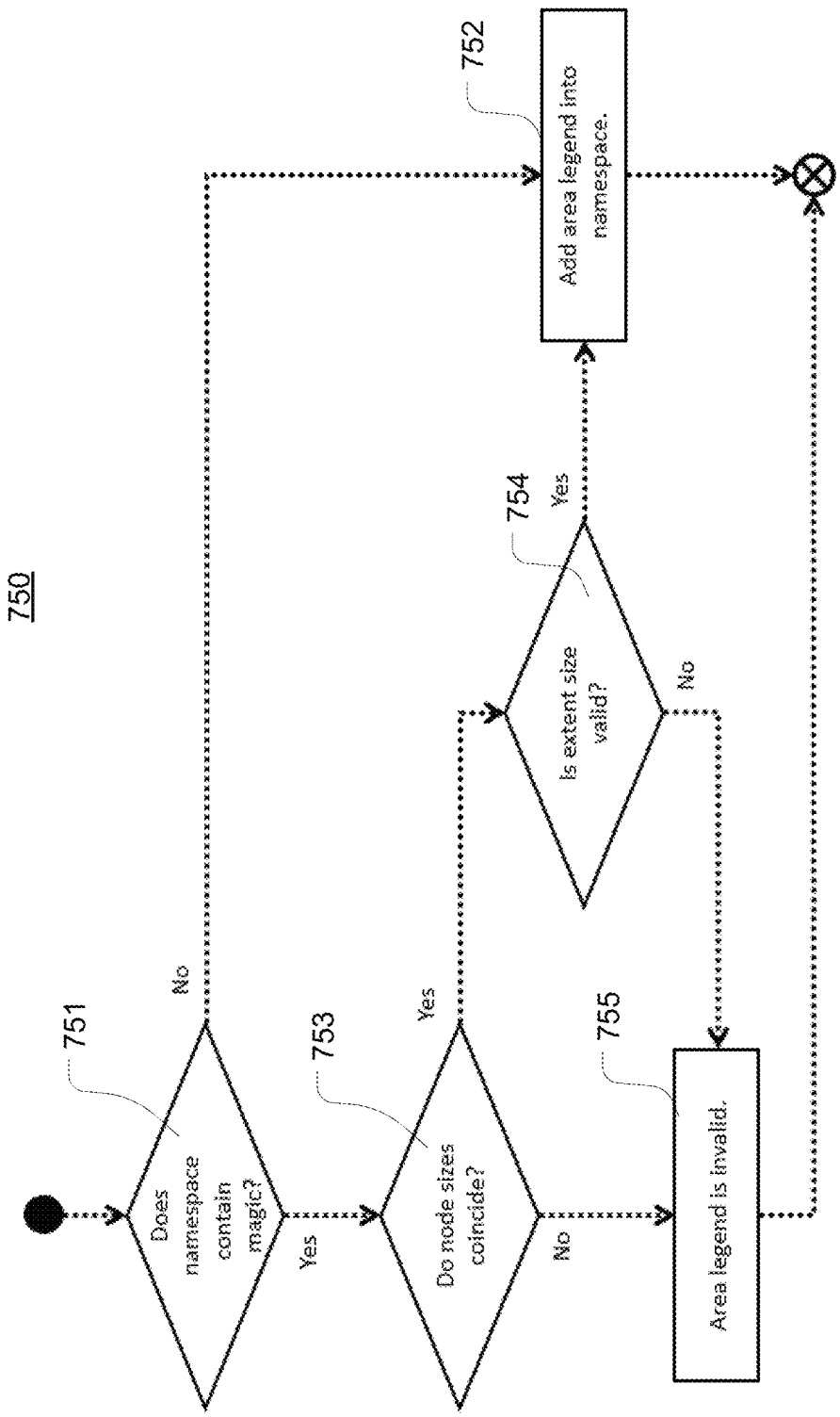
FIG. 7B is a flowchart depicting an exemplary verification process responsive to a request for adding an area legend to a namespace according to an embodiment of the present disclosure.

FIG. 7B is a flowchart depicting an exemplary verification process 750 responsive to a request for adding an area legend to a namespace according to an embodiment of the present disclosure. At 751, it is determined whether the namespace contains a legend with the magic signature that is provided in the request. If the namespace does not include such magic signature, a new legend can be added at 752 as requested without further verification. Otherwise, at 753, the node size in the existing legend with the magic signature is compared with the node size of the legend to be added. If the node sizes do not coincide, the area legend provided in the request is treated as invalid at 755 and, so, cannot be added to the namespace. If the node sizes do coincide, at 754, the extent in the legend to be added is compared with a clump size of reservation (e.g., a minimum, default, or maximum size). If the extent size is equal to minimum, default, or maximum clump size of reservation, the area legend is added to the namespace at 752. Otherwise, the area legend provided in the request is treated as invalid at 755.

A verification mechanism according to the present disclosure can be implemented as software, hardware, or a combination thereof on a storage device (e.g., a hard disk drive) and/or a host (computer or data storage system). Further, a verification mechanism can be used in a local file system or distributed file system. In some embodiments, the data storage system is a single computing device where the verification system may be a dedicated operating system utility or a dedicated application program. In some other embodiments, the verification system is integrated in an operating system, a file system creation utility, or an application program. In still some other embodiments, the data storage system is a server-client system having a file system server and coupled to a storage device.

FIG. 8A illustrates the configuration of an exemplary data storage system 800 with a verification subsystem 813 resident on a host 810 according to an embodiment of the present disclosure. The host 810 includes the file system driver 811 that initiates read/write requests to the block layer subsystem 812. The block layer subsystem 812 can transform the file system's read/write requests into Small Computer System Interface (SCSI)/Serial Advanced Technology Attachment (SATA) packets. The verification subsystem 813 can check the file system's write requests before transformation into SCSI/SATA packets. Alternatively, the verification subsystem 813 checks the SCSI/SATA packets that are received from the host's block layer subsystem 812 (as shown). The file system volume and the associated verified area legends are stored on the storage device 820. In this configuration, the verification subsystem 813 can be managed fairly easily. For example, a user can define when the verification can be active or inactive.

When the file system driver 811 issues a request to modify a file system volume or a namespace stored in the storage device 820, the verification subsystem 813 accesses the verified area legends and verifies the validity of the request, as described in greater detail with reference to FIGS. 5-7B. The verified area legends may first be read from the storage device into the Dynamic Random Access Memory (DRAM) during a file system mount operation such that the file system accesses the verified area legends from the DRAM.

FIG. 8B illustrates the configuration of another exemplary data storage system 850 with a verification subsystem 871 resident on a storage device 870 according to an embodiment of the present disclosure. The host 860 includes the file system driver 861 that initiates read/write requests to the block layer 862. The block layer subsystem 862 transforms the file system's read/write requests into SCSI/SATA packets. The verification subsystem 871 is resident on the storage device. The verification subsystem 871 includes checking SCSI/SATA packets that are received from host's block layer subsystem 862. For storage devices with limited computational power, the verification subsystem 871 is preferably implemented as a hardware module (for example including a Field Programmable Gate Array (FPGA) or Application Specific Integrated Circuit (ASIC)).

Figure 9:
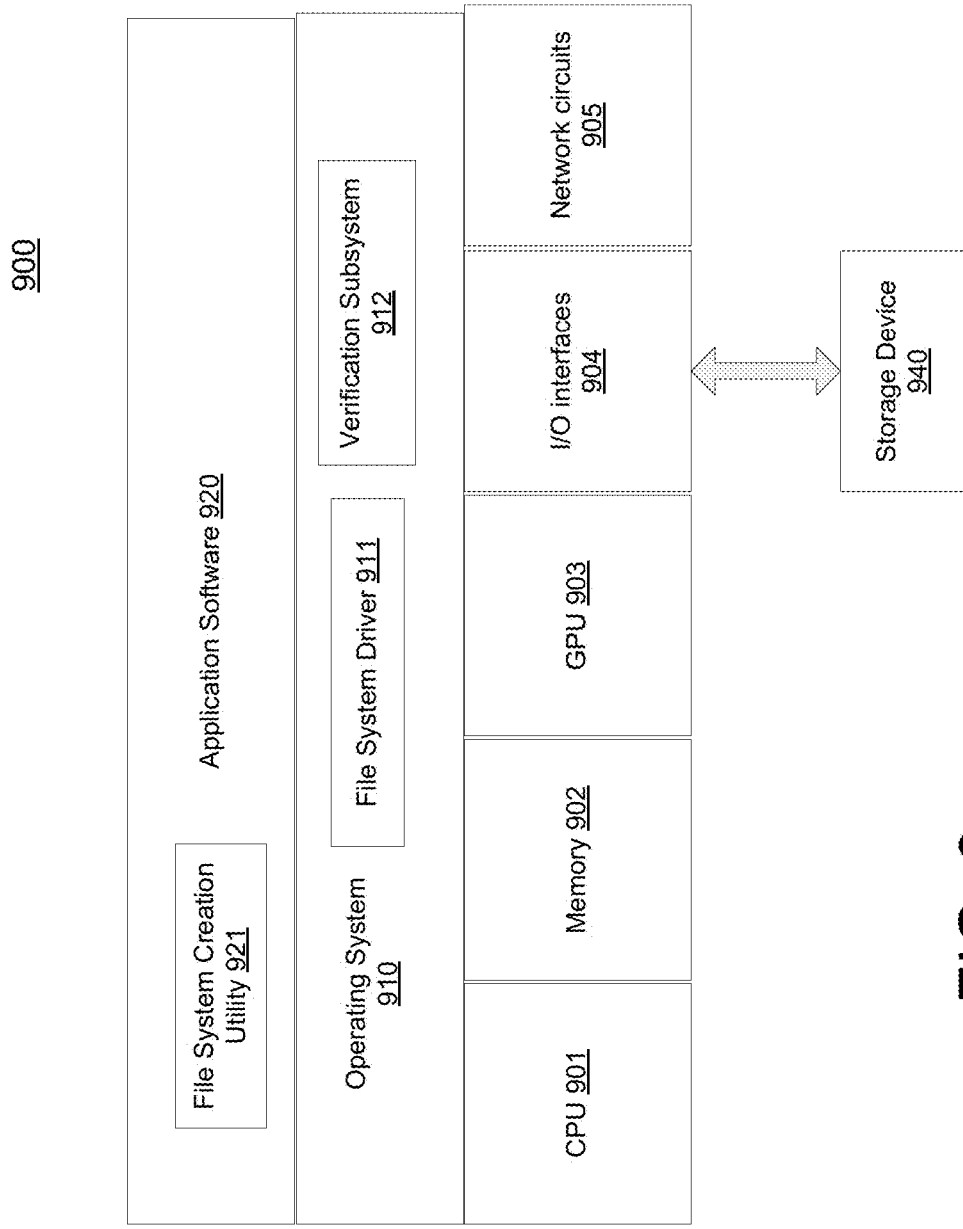
FIG. 9 is a block diagram illustrating an exemplary computing system capable of preventing improper write operations on file system metadata through a verification process according to an embodiment of the present disclosure.

FIG. 9 is a block diagram illustrating an exemplary computing system 900 capable of preventing improper operations on file system metadata through a verification process according to an embodiment of the present disclosure. The computing system 900 includes a processor 901, system memory 902, a graphics processing unit (GPU) 903, Input/Output (I/O) interfaces 904, and network circuits 905, an operating system 910, and application software 920. The file system creation utility 921 is implemented as an application program. The operating system 910 includes the file system driver 911 and a verification subsystem 912. In some other embodiments, the verification subsystem can be implemented as an individual or part of an application program as well. In the illustrated example, the computing system 900 is coupled to a storage device 940 through the I/O interfaces 904. The storage device 940 stores user data, metadata records, and verified area legends that characterize the metadata areas storing the metadata records of metadata structures. In some other embodiments, the storage device may be coupled to the computing system 900 through the network circuits 905 and a communication network. In this case, the verification subsystem is preferably resident on the storage device side.

When incorporating configuration input and executed by the CPU 901, the file system creation utility 921 can create a file system volume in the storage device. The file system driver 911 manages user data and metadata in the storage device 940. The file system driver 911 can store the verified area legends for metadata on the storage device 940, initiate requests for adding, deleting, or otherwise modifying the metadata or the verified legends. The verification subsystem 912 verifies the validity of the requests based on the verified area legends.

In some embodiments, namespace creation and deletion processes according to the present disclosure can be integrated in the file system creation utility 921 (e.g., an MKFS utility) or separate from the file system creation utility. The file system creation utility can be responsible for filling in the group descriptors in a namespace based on the file system details. In some embodiments, the file system driver communicates with the verification subsystem with respect to new metadata reservations, so it can generate valid requests based on the suitable data and results of the verification and make changes to the namespace as appropriate. In some other embodiments, new metadata area reservations are tracked on the basis of analysis of metadata changes in the file system volume by the verification subsystem itself. Thus, a verification process can be transparent to the file system driver.

The verification subsystem 912 may perform various other functions as discussed in detail with reference to FIG. 1 to FIG. 8B. As will be appreciated by those skilled in the art, the present disclosure is not limited to any specific operating system. The operating system 910 may be DOS, Windows, OS/2, Macintosh, and Unix-based operating systems or any other operating system that is well-known in the art.

A verification system (or subsystem) can be configured by a user manually or automatically by a software program according to the present disclosure. For example, the verification functions (including metadata verification and namespace verification) can be disabled, enabled, or customized to suit various needs for operation and protection under specified circumstances. Verification logic can be resident on a host side (for example, in the block layer) or a storage side in a host-storage system. It will be appreciated that the present disclosure is not limited to any specific configuration of a verification system for verifying metadata and namespace modification requests.

Figure 10:
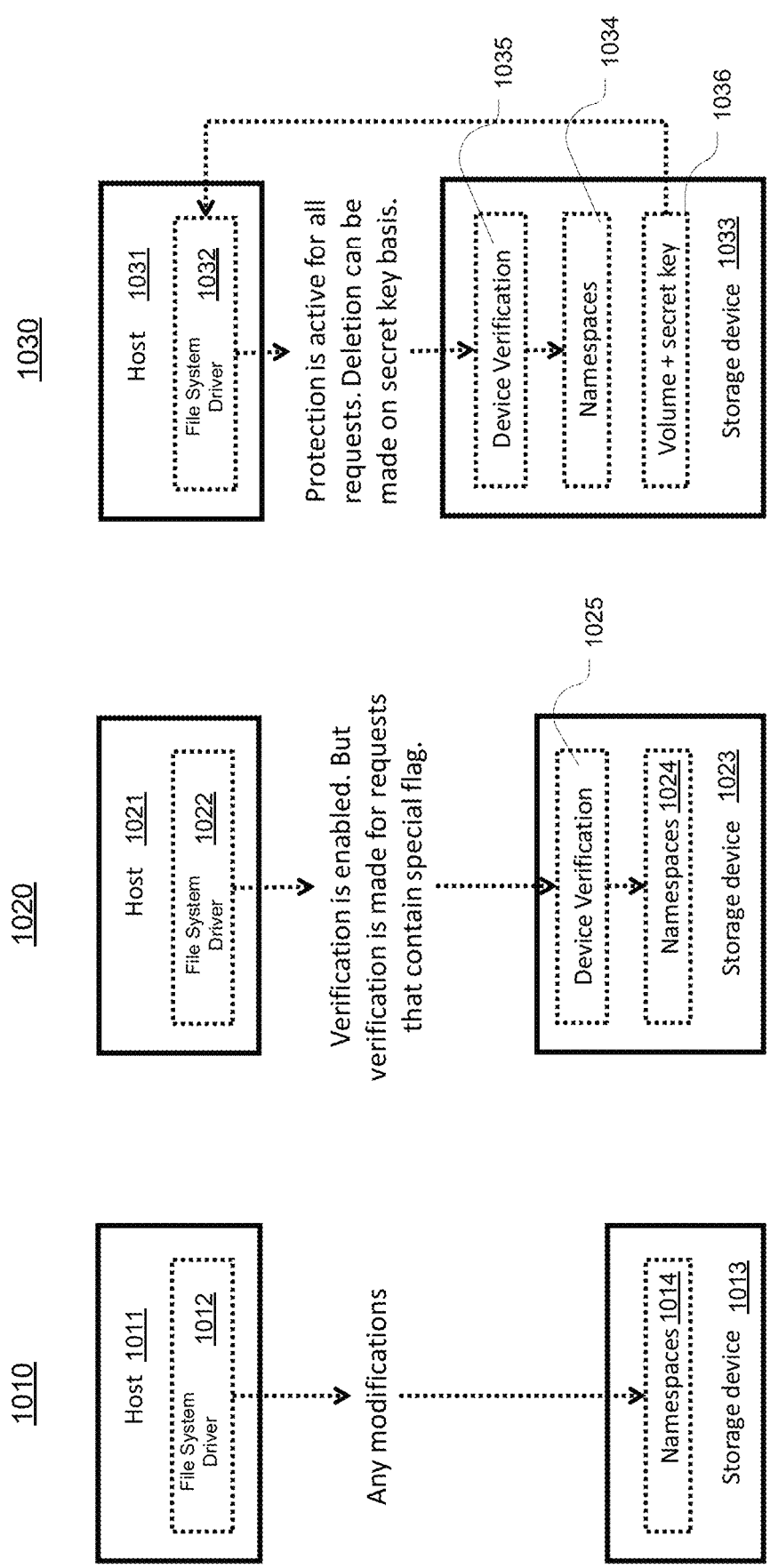
FIG. 10 illustrates exemplary configurations of verification systems and processes according to embodiments of the present disclosure.

FIG. 10 illustrates exemplary configurations of verification systems and processes according to embodiments of the present disclosure. In the illustrated examples, the verification logic and the namespaces (1014, 1024, and 1034) are resident on the storage device, and the file system drivers (1012, 1022, and 1032) are resident on the host. However, it will be appreciated that the verification processes described with reference to FIG. 10 can also be implemented in systems where the verification logic and the namespaces are resident on a host.

In some scenarios, an available verification system may remain deactivated (e.g., based on user instructions and configurations). For example, an end-user may determine that the file system is trustworthy and instruct to skip the verification processes for the metadata-related write operations. Diagram 1010 shows an exemplary configuration of a host-storage system (devices 1011 and 1013) with the verification function disabled universally for all requests. In this configuration, any requested modification (or write operation) on the namespace 1014 or the metadata stored in the storage device 1013 is performed without verification. An exemplary approach to by-pass write operation verification is not to create namespaces when reserving metadata areas, even though space may have been reserved for storing namespaces in the storage device. It will be appreciated that any other suitable manner can also be used to block metadata verification without departing from the scope of the present disclosure.

In some other scenarios, a verification system may be used to selectively verify metadata-related write requests, while namespaces may be created for all the metadata. For example, requests for writing into journal area are not verified, while the requests for writing into the final locations of metadata are verified. Diagram 1020 shows an exemplary configuration of a host-storage system (devices 1021 and 1023) with the verification function enabled only for requests associated with an indication of the demand for verification (e.g., a special flag). In this configuration, if the modification request sent from the file system driver 1022 is associated with the special flag, the request is subject to verification through the verification logic 1025. If the request is verified to be valid, the requested modification is performed. This approach advantageously increases flexibility and performance of managing a whole data storage stack.

Diagram 1030 shows an exemplary configuration of a host-storage system (1031 and 1033) with the verification function enabled universally for all requests. In this configuration, any requested modification sent from the file system driver 1032 is verified by the verification logic 1035 to confirm the validity before performance. Particularly, a requested deletion action may be subject to stricter verification, which requires proof of a special authorization (e.g., in the form of a secret key provided in the request).

According to embodiments of the present disclosure, a namespace can be stored in various ways. In some embodiments, a namespace can be stored in a dedicated partition, with or without encryption. Encryption can be used for further protecting namespace data from unauthorized access and modification. In some other embodiments, namespace data can be stored in a special memory area in the storage device (e.g., a dedicated NAND flash chip). The special memory area in combination with an associated special user interface can advantageously provide better protection for the namespace data.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A data storage system, comprising:
a processor; and
a storage device storing instructions that, when executed by the processor, cause performing:
processing a first write operation request for performing a first write operation on a first metadata record in a file system volume of the storage device;
prior to performing the first write operation in the file system volume and in response to the first write operation request:
extracting information from the first write operation request;
generating, in a namespace storage area of the storage device, a namespace for a first plurality of metadata areas, wherein the namespace comprises multiple values associated with multiple descriptors, wherein the multiple descriptors characterize a respective metadata area of the first plurality of metadata areas, wherein the file system volume comprises the first plurality of metadata areas, wherein the first plurality of metadata areas are configured to store a plurality of metadata records, wherein the plurality of metadata records comprises the first metadata record in the file system volume; and
verifying the first write operation request based on verification logic and based on comparing the extracted information, not all information, of the first write operation request to the multiple values associated with multiple descriptors of the namespace in the namespace storage area of the storage device; and
based on the verifying the first write operation, determining whether to perform the first write operation in the file system volume,
wherein:
the namespace storage area of the storage device is different than and outside of the file system volume of the storage device;
the first metadata record comprises information on usage of data blocks;
the namespace is different from the first metadata record; and
the multiple descriptors of the namespace are independent of peculiarities of a file system and independent of metadata content of the first metadata record.

2. The data storage system of claim 1, wherein when the instructions are executed by the processor, the instructions cause performing:
processing a first indication to verify a write operation request associated with a category; and
identifying the first plurality of metadata areas in the file system volume of the storage device.

3. The data storage system of claim 2, wherein the write operation request associated with the category comprises a flag, and
wherein when the instructions are executed by the processor, the instructions cause performing: identifying the flag in the first write operation request prior to verifying the first write operation request.

4. The data storage system of claim 2, wherein the namespace is stored in a dedicated partition of the storage device, wherein the dedicated partition is separate from a partition in the storage device for storing the plurality of metadata records.

5. The data storage system of claim 1, wherein when the instructions are executed by the processor, the instructions cause performing:
responsive to a second indication, reserving a second plurality of metadata areas without creating a namespace associated therewith, wherein the second plurality of metadata areas comprises a metadata area for a second metadata record.

6. The data storage system of claim 1, wherein the verification logic is configured to:
receive a second indication to disable verification fora write operation request in the file system volume;

receive a second write operation request for a second write operation on a second metadata record; and based on the second indication, perform the second write operation without verifying the second write operation request.

7. The data storage system of claim 6, wherein when the instructions are executed by the processor, the instructions cause performing:

responsive to the second indication:
reserving a second plurality of metadata areas without creating a namespace, wherein the second plurality of metadata areas comprises a metadata area for the second metadata record.

8. The data storage system of claim 1, wherein the verification logic is resident on the data storage system and implemented in hardware circuitry.

9. The data storage system of claim 1, wherein a file system driver is configured to generate a corrected first write operation request based on the verifying.

10. A data storage system, comprising:

a processor;

a storage device;

means for processing, utilizing the processor, a first write operation request for performing a first write operation on a first metadata record in a file system volume of the storage device;

prior to performing the first write operation in the file system volume:

means for extracting information from the first write operation request;

means for generating, utilizing the processor, in a namespace storage area of the storage device, a namespace for a first plurality of metadata areas, wherein the namespace comprises multiple values associated with multiple descriptors, wherein the multiple descriptors characterize a respective metadata area of the first plurality of metadata areas, wherein the file system volume comprises the first plurality of metadata areas, wherein the first plurality of metadata areas are configured to store a plurality of metadata records, wherein the plurality of metadata records comprises the first metadata record; and means for verifying, utilizing the processor, the first write operation request based on verification logic and based on comparing the extracted information, not all information, of the first write operation request to the multiple values associated with multiple descriptors of the namespace in the namespace storage area of the storage device; and based on verifying the first write operation, means for determining, utilizing the processor, whether to perform the first write operation in the file system volume, wherein:

the namespace storage area of the storage device is different than and outside of the file system volume of the storage device;

the first metadata record comprises information on usage of data blocks;

the namespace is different from the first metadata record; and the multiple descriptors of the namespace are independent of peculiarities of a file system and independent of metadata content of the first metadata record.

11. A machine-implemented method, comprising:

processing, utilizing a processor, a first write operation request to perform a first write operation on a first metadata record in a file system volume of a storage device;

prior to performing the first write operation in the file system volume:

extracting information from the first write operation request;

generating, utilizing the processor, in a namespace storage area of the storage device, a namespace for a first plurality of metadata areas, wherein the namespace comprises multiple values associated with multiple descriptors, wherein the multiple descriptors characterize a respective metadata area of the first plurality of metadata areas, wherein the file system volume comprises the first plurality of metadata areas, wherein the first plurality of metadata areas are configured to store a plurality of metadata records, wherein the plurality of metadata records comprises the first metadata record; and verifying, utilizing the processor, the first write operation request based on verification logic and based on comparing the extracted information, not all information, of the first write operation request to the multiple values associated with multiple descriptors of the namespace in the namespace storage area of the storage device; and based on the verifying the first write operation, determining, utilizing the processor, whether to perform the first write operation in the file system volume, wherein:

the namespace storage area of the storage device is different than and outside of the file system volume of the storage device;

the first metadata record comprises information on usage of data blocks;

the namespace is different from the first metadata record; and the multiple descriptors of the namespace are independent of peculiarities of a file system and independent of metadata content of the first metadata record.

12. The machine-implemented method of claim 11, comprising:

processing a first indication to verify a write operation request associated with a category; and identifying the first plurality of metadata areas in the file system volume of the storage device.

13. The machine-implemented method of claim 12, wherein the write operation request associated with the category comprises a flag, and wherein the method comprises identifying the flag in the first write operation request prior to verifying the first write operation request.

14. The machine-implemented method of claim 12, comprising:

writing the namespace in a dedicated partition of the storage device, wherein the dedicated partition is separate from a partition in the storage device for storing the plurality of metadata records, and wherein the namespace is stored in a plain text format, a binary format, or Extensible Markup Language (XML) format.

15. The machine-implemented method of claim 12, comprising:

writing the namespace in a dedicated non-volatile chip that is separate from the storage device for storing the plurality of metadata records.

16. The machine-implemented method of claim 15, wherein the writing comprises encrypting the namespace, and wherein the verifying comprises extracting a secret key from the first write operation request.

17. The machine-implemented method of claim 12, wherein the write operation request associated with the category is generated by a file system driver, and wherein the verifying the first write operation request is caused to be performed at a host server in a host-storage system, wherein information in the first write operation request comprises one or more of: a predetermined signature; a node size; a clump size of reservation; and an extent.

18. The machine-implemented method of claim 11, comprising:
receiving a second indication to disable verification for a write operation request in the file system volume;
receiving a second write operation request for a second write operation on a second metadata record; and
based on the second indication, performing the second write operation without verifying the second write operation request.

19. The machine-implemented method of claim 18, comprising:
responsive to the second indication, reserving a second plurality of metadata areas without creating a namespace associated therewith, wherein the second plurality of metadata areas comprises a metadata area for a second metadata record.

20. The machine-implemented method of claim 11, comprising:
generating, by a file system driver, a corrected first write operation request based on verifying the first write operation request, wherein verifying the first write operation request is performed at the storage device.

* * * * *